(12) United States Patent
Nakao et al.

(10) Patent No.: US 8,554,288 B2
(45) Date of Patent: Oct. 8, 2013

(54) PORTABLE TERMINAL EQUIPMENT AND THIN-TYPE HOUSING REINFORCING STRUCTURE FOR USE IN SAME

(75) Inventors: Junichi Nakao, Tokyo (JP); Yasuyuki Honma, Shizuoka (JP)

(73) Assignee: NEC Corporation, Tokyo (JP)

( * ) Notice: Subject to any disclaimer, the term of this patent is extended or adjusted under 35 U.S.C. 154(b) by 604 days.

(21) Appl. No.: 12/442,217

(22) PCT Filed: Aug. 24, 2007

(86) PCT No.: PCT/JP2007/066423
§ 371 (c)(1),
(2), (4) Date: Mar. 20, 2009

(87) PCT Pub. No.: WO2008/035537
PCT Pub. Date: Mar. 27, 2008

(65) Prior Publication Data
US 2010/0041449 A1    Feb. 18, 2010

(30) Foreign Application Priority Data
Sep. 20, 2006    (JP) ................................. 2006-253652

(51) Int. Cl.
*H04M 1/00* (2006.01)

(52) U.S. Cl.
USPC .................. 455/575.3; 455/575.1; 455/575.8; 379/433.01; 379/433.04; 379/433.11; 379/433.13; 379/428.01

(58) Field of Classification Search
USPC ............ 455/575.1, 575.3, 575.8; 379/433.01, 379/433.04, 433.11, 433.13, 428.01
See application file for complete search history.

(56) References Cited

U.S. PATENT DOCUMENTS

| 7,142,898 | B2 * | 11/2006 | Takagi ...................... 455/575.3 |
| 2005/0009587 | A1 * | 1/2005 | Lee ............................ 455/575.8 |
| 2005/0030728 | A1 * | 2/2005 | Kawashima et al. ........... 362/31 |
| 2005/0285991 | A1 * | 12/2005 | Yamazaki ...................... 349/58 |
| 2007/0019128 | A1 * | 1/2007 | Kwon ............................ 349/58 |
| 2008/0037771 | A1 * | 2/2008 | Black et al. .............. 379/433.01 |

FOREIGN PATENT DOCUMENTS

| JP | 1996298385 A | 11/1996 |
| JP | 1997123209 A | 5/1997 |
| JP | 1998256738 A | 9/1998 |
| JP | 1999154790 A | 6/1999 |

(Continued)

OTHER PUBLICATIONS

Supplementary European Search Report for EP 07 79 2955 completed Jan. 21, 2010.

(Continued)

*Primary Examiner* — Steve D Agosta

(57) ABSTRACT

A front case at a display section side of frame shape is formed of metal material having strength and a bathtub-shaped draw frame formed by drawing metal plate is fixed at the external side of the front case at the display section side by heat adhesive to be integral with the front case at the display section side. Two L-shaped frames formed by bending metal plate materials are fixed at the internal side of the front case at the display section side by two heat adhesives to be integral with the front case at the display section side. The front case at the display section side, the two L-shaped frames, and the bathtub-shaped draw frame are integral with each other to have sandwich structure.

12 Claims, 4 Drawing Sheets

(56) References Cited

FOREIGN PATENT DOCUMENTS

| JP | 2001518427 A | 10/2001 |
|----|--------------|---------|
| JP | 2004007262 A | 1/2004 |
| JP | 2004251938 A | 9/2004 |
| JP | 2005039670 A | 2/2005 |
| WO | 03075079 A | 9/2003 |

OTHER PUBLICATIONS

International Search Report for PCT/JP2007/066423 mailed Nov. 20, 2007.

* cited by examiner

PORTABLE TERMINAL EQUIPMENT AND THIN-TYPE HOUSING REINFORCING STRUCTURE FOR USE IN SAME

TECHNICAL FIELD

This application is the National Phase of PCT/JP2007/066423, filed Aug. 24, 2007, which is based upon and claims priority from Japanese Patent Application No. 2006-253652 filed Sep. 20, 2006.

TECHNICAL FIELD

The present invention relates to a portable terminal equipment and a thin-type housing reinforcing structure for use in the same, in particular to a thin-type housing of a portable telephone.

BACKGROUND TECHNIQUE

It is a recent trend to obtain a folding-type portable telephone in a market of portable telephones. In particular, a folding-type portable telephone rendered to be thin is required in the market. Therefore, folding-type portable telephones each aiming at a thin-type appears in the market one by one (For example, Patent references 1, 2 should be referred). However, it is always an object for realizing the thin-type to achieve strength of the folding-type portable telephone.

Patent reference 1: An official gazette of an unexamined Japanese patent publication 2004-251938

Patent reference 2: An official gazette of an unexamined Japanese patent publication 2005-039670

DISCLOSURE OF THE INVENTION

Problem to be Solved by the Invention

In a case of a folding-type portable telephone of a thin size, strength of the folding-type portable telephone of a thin size is not enough, even if a main housing thereof is made of a metal. Consequently, it is not possible to provide a folding-type portable telephone of a thin size of which strength is achieved.

It is therefore an object of the present invention to solve the above-described problems and to provide a portable terminal equipment mainly of which rigidity against bending can be improved drastically and a thin-type housing reinforcing structure for use in the portable terminal equipment.

Means for Solving the Problem

A portable terminal equipment according to the present invention is a portable terminal equipment including at least a plurality of housing parts, in which an L-shaped frame made of a metal plate is adhered and fixed on an internal surface of at least one housing part among the above a plurality of housing parts to be integrally with the one housing part, in addition, a bathtub-shaped draw frame made of a metal plate is adhered and fixed on an external surface of the one housing part to be integrally therewith, the one housing part thereby has a sandwich structure.

A thin-type housing reinforcing structure according to the present invention is a thin-type housing reinforcing structure for use in a portable terminal equipment including at least a plurality of housing parts, in which an L-shaped frame made of a metal plate is adhered and fixed on an internal surface of at least one housing part among the above a plurality of housing parts to be integrally with the one housing part, in addition, a bathtub-shaped draw frame made of a metal plate is adhered and fixed on an external surface of the one housing part to be integrally therewith, the one housing part thereby has a sandwich structure.

Namely, according to the portable terminal equipment of the present invention, in a thin-size portable equipment such as a folding-type portable telephone, and the like, parts of metal plates made of highly rigid materials are adhered and fixed on internal, external surfaces respectively of a main housing formed of a metal capable of being formed, so that a sandwich structure is employed therein.

According to the portable terminal equipment of the present invention, a front case at a display section side, as a main housing at the display section side, of a thin-size folding-type portable telephone is made of a material of a metal, such as a magnesium alloy, and the like capable of being formed. Further, a bathtub-shaped draw frame made of a metal plate is adhered and fixed on an external side of the front case at the display section side while two L-shaped frames each made of a metal plate are adhered and fixed on both side surfaces of an internal side of the front case at the display section side. Namely, the portable terminal equipment of the present invention has a sandwich structure, in which the parts of metal plates are adhered and fixed on internal, external surfaces respectively of the front case at the display section side as a main metal housing. This provides a thin-size folding-type portable telephone in which strength can be achieved.

To be explained more concretely, according to the portable terminal equipment of the present invention, the front case of a frame shape at the display section side is formed of a metal material having strength. Further, the bathtub-shaped draw frame made by drawing a metal plate material is fixed on an external side of the front case at the display section side by the use of heat adhesive, thereby, the front case at the display section side and the bathtub-shaped draw frame are rendered to be integral with each other. Moreover, two L-shaped frames each made by bending a metal plate material are fixed on an internal side of the front case at the display section side by the use of two heat adhesives, thereby, the front case at the display section side and the L-shaped frames are rendered to be integral with each other.

In other words, according to the portable terminal equipment of the present invention, the two L-shaped frames and the bathtub-shaped draw frame each made of a metal plate material reinforced by bending or drawing are thermally adhered and fixed on internal and external surfaces of the front case made of a metal material, such as a magnesium alloy, and the like, at the display section side. The portable terminal equipment of the present invention thereby has the sandwich structure, in which a plurality of parts are rendered to be integral with each other. Even if a portable terminal equipment, such as a folding-type portable telephone, and the like becomes a thin-type one, it is possible to drastically improve rigidity mainly against bending.

Further, according to the portable terminal equipment of the present invention, the front case at the display section side is determined to have a minimum thickness thereof, so that a substrate on which LCD (Liquid Crystal Display) for display, LCD frame and electrical parts are mounted may be mounted on the front case at the display section side. A thickness obtained by a sum up of a deepness of drawing of the bathtub-shaped draw frame and a height of bending of the L-shaped frame is contained within parts thickness of the front case at the display section side. The portable terminal equipment, such as a folding-type portable telephone, and the like thereby can be made thin in size while achieving strength thereof.

Effects of the Invention

A portable terminal equipment according to the present invention has a structure described above. The portable terminal equipment can obtain an advantageous effect that rigidity mainly against bending can be improved drastically, even if the portable terminal equipment is made thin in size.

Figure 1:
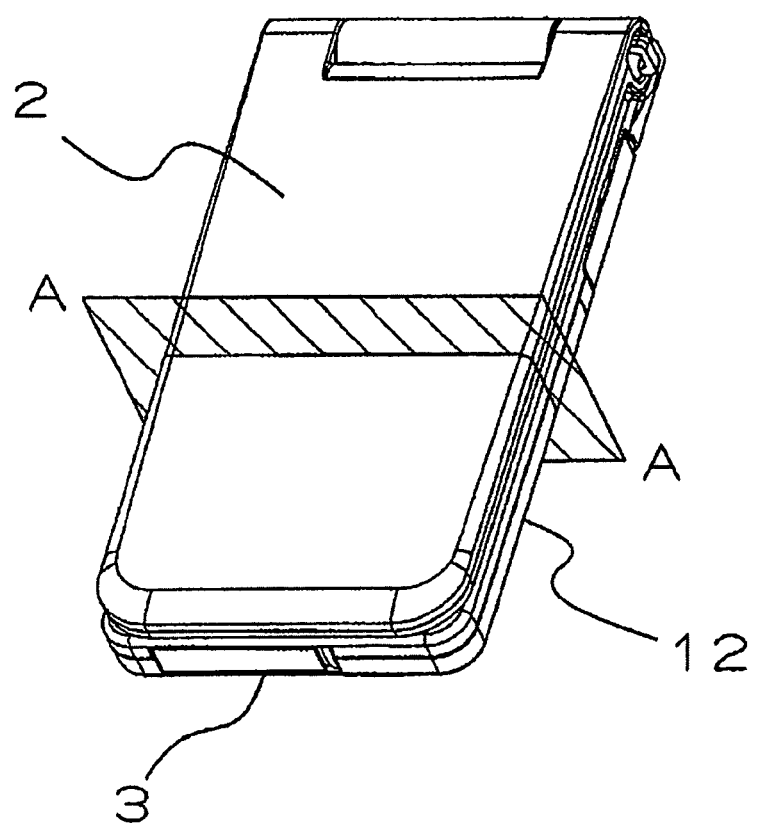
FIG. 1 A perspective view for showing a closed condition of a portable terminal equipment according to an embodiment of the present invention.

DESCRIPTION OF REFERENCE NUMERALS 1 front case at a display section side
1a main display section
1b hinge section
2 rear cover at a display section side
3 housing at an operation section
3a key operation section
4 bathtub-shaped draw frame
4a bathtub section
5 L-shaped frame
5a bending section
6 display screen window
7 LCD for display
8 LCD frame
9 substrate
10, 11 heat adhesive
12 thin-size folding-type portable telephone

BEST MODE FOR CARRYING OUT THE INVENTION

Figure 2:
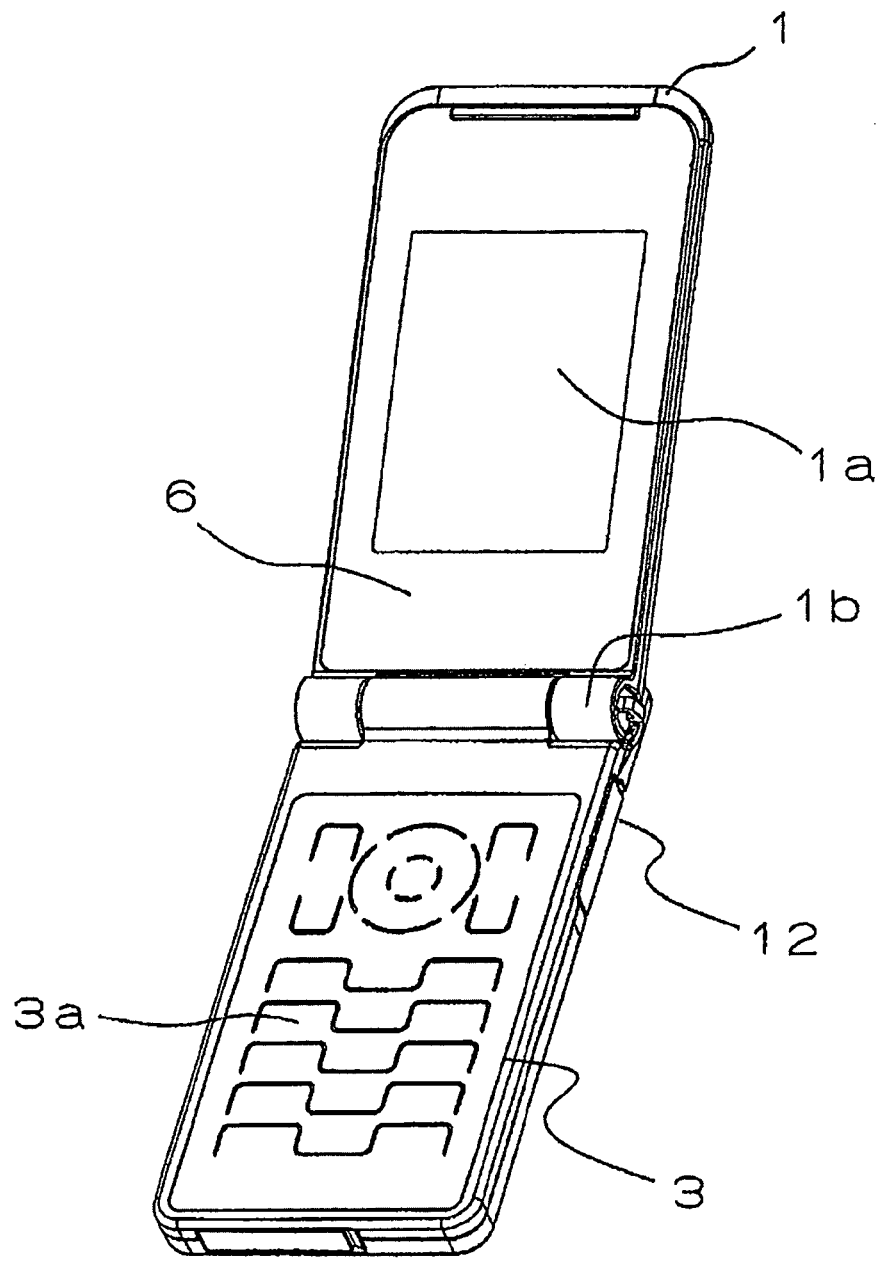
FIG. 2 A perspective view for showing an opened condition of a portable terminal equipment according to an embodiment of the present invention.

Next, description will be made about an embodiment of the present invention with reference to the drawings. FIG. 1 is a perspective view for showing a closed condition of a portable terminal equipment according to an embodiment of the present invention while FIG. 2 is a perspective view for showing an opened condition of the portable terminal equipment according to the embodiment of the present invention. A thin-size folding-type portable telephone is shown as the portable terminal equipment in FIGS. 1 and 2.

Figure 3:
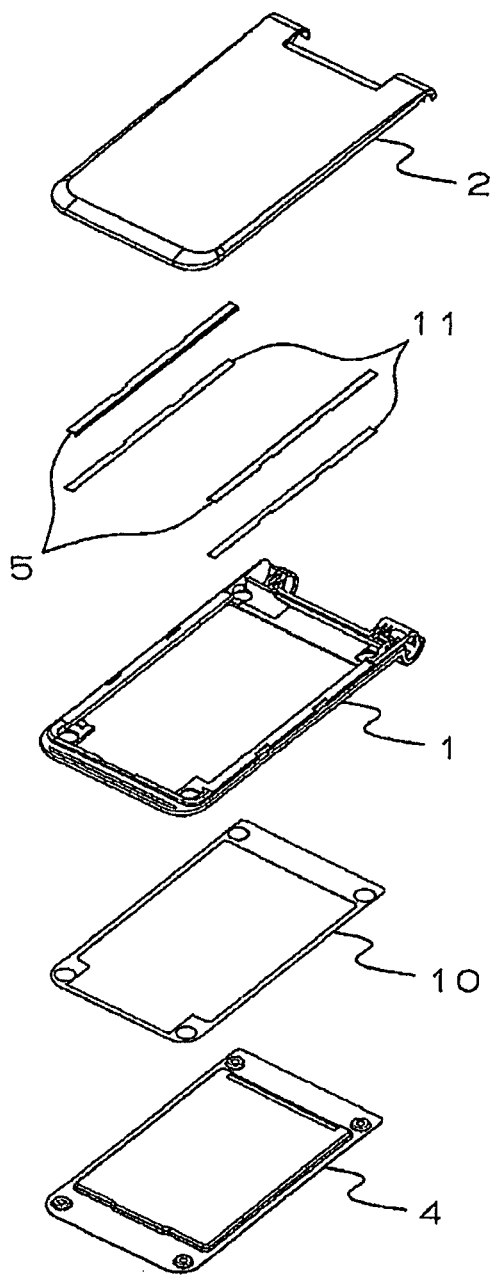
FIG. 3 An exploded perspective view for showing main parts at a display section side of a thin-size folding-type portable telephone according to an embodiment of the present invention.
Figure 4:
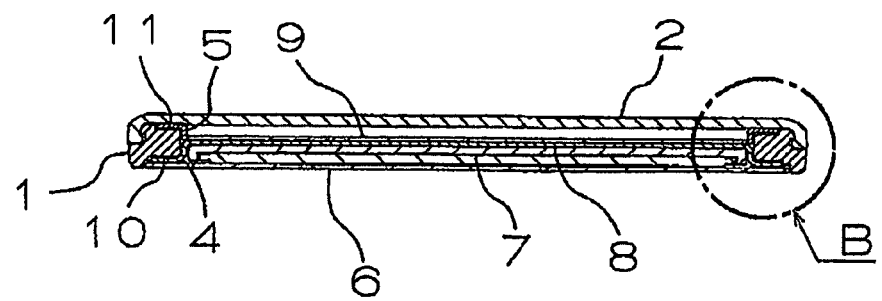
FIG. 4 A cross sectional view along A-A line of FIG. 1.
Figure 5:
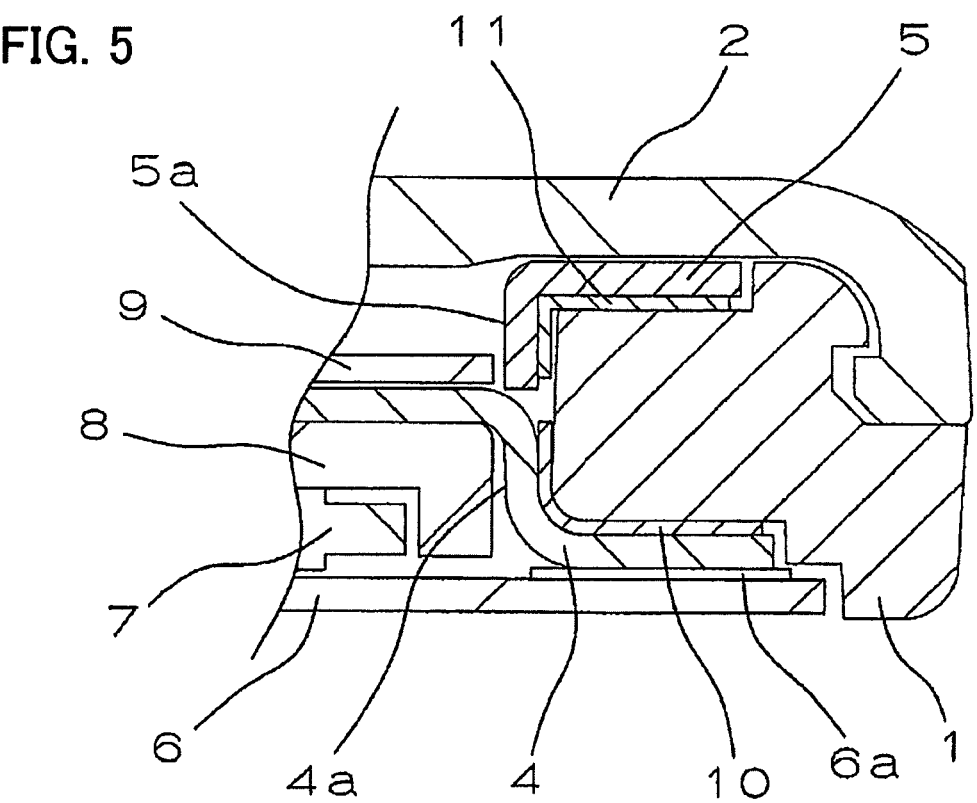
FIG. 5 A detailed view for showing B section of FIG. 4.

FIG. 3 is an exploded perspective view for showing main parts at a display section side of a thin-size folding-type portable telephone according to the embodiment of the present invention. FIG. 4 is a cross sectional view along A-A line of FIG. 1. FIG. 5 is a detailed view for showing B section of FIG. 4.

In these FIGS. 1 through 5, a thin-size folding-type portable telephone 12 comprises a front case at a display section side 1 as a main housing at a display section side having a main display section 1a and a hinge section 1b, a rear cover at a display section side 2 which particularly depends on design factor, and a housing at an operation section 3 having a key operation section 3a, that are formed as main parts thereof.

A bathtub-shaped draw frame 4 made of a metal plate attached from an external side of the front case at the display section side 1 and two L-shaped frames 5 attached from an internal side of the front case at the display section side 1 are thermally adhered and fixed on the front case at the display section side 1 by the use of heat adhesives 10 and 11, respectively, so that the bathtub-shaped draw frame 4, the two L-shaped frames 5 and the front case at the display section side 1 are rendered to be integral with each other and become one part of the thin-size folding-type portable telephone 12.

Referring to the above FIGS. 1 through 5, description will be made as regards a method of manufacturing the thin-size folding-type portable telephone 12 according to the embodiment of the present invention. A housing at a display section side of the thin-size folding-type portable telephone 12 comprises the front case at the display section side 1 and the rear cover at the display section side 2.

The front case at the display section side 1 has the main display section 1a located in a major part of the front case at the display section side 1. Therefore, the front case at the display section side 1 is such a part that a strength thereof is required to a level capable of preventing the main display section 1a from being destroyed during an actual use. In addition, the front case at the display section side 1 is also such a part that complicated configurations are required in a portion fitted into the rear cover at the display section side 2, the hinge section 1b for being attached with a hinge, or the like. Therefore, a material of the front case at the display section side 1 is a metal material, such as a magnesium alloy, and the like capable not only of achieving strength of the front case at the display section side 1 but also of forming the complicated configurations thereof.

The rear cover at the display section side 2 is positioned at an externally appearing portion of the thin-size folding-type portable telephone 12, even if the thin-size folding-type portable telephone 12 is set both in an opened condition and in a closed condition. Therefore, design characteristics are particularly important in the rear cover at the display section side 2. Thus, the rear cover at the display section side 2 is such a part that various designed configurations of appearance thereof are required. Therefore, a material of the rear cover at the display section side 2 is a resin material capable of readily forming the various configurations thereof.

In a structure of the display section side of the thin-size folding-type portable telephone 12, the front case at the display section side 1 of a frame shape is located on an appearance surface of an internal side of the thin-size folding-type portable telephone 12. A display screen window 6 is adhered by the use of a double-stick tape 6a and fixedly located on the front case at the display section side 1 to occupy a major part of the appearance thereof. Further, an LCD (Liquid Crystal Display) for display 7 is located in the internal portion of the display screen window 6.

The LCD for display 7 is contained and fixed in the bathtub-shaped draw frame 4 thermally adhered and fixed with the front case at the display section side 1 together with an LCD frame 8. A substrate 9 on which electrical parts are mounted is located on another surface of the bathtub-shaped draw frame 4 opposite to the surface on which the LCD frame 8 is contained. The rear cover at the display section side 2 is located at an external side of the substrate 9 to form an external appearance surface of the thin-size folding-type portable telephone 12.

The bathtub-shaped draw frame 4 and two L-shaped frames 5 are fixed on the front case at the display section side 1 by the heat adhesives to form one rigid body. The bathtub-shaped draw frame 4 is made of a metal plate material capable of achieving strength, even if the metal plate material is thin. Further, the metal plate material is drawn to form a bathtub-section 4a in the bathtub-shaped draw frame 4 in order to increase strength thereof. Each of the L-shaped frames 5 is made of a metal plate material capable of achieving strength, even if the metal plate material is thin. Further, the metal plate material is bended like L-shape to form a bending section 5a in the L-shaped frame 5 in order to increase strength thereof.

The bathtub-shaped draw frame 4 is adhered and fixed on the appearance surface and the internal side surface of the front case at the display section side 1 by the heat adhesive 10 capable of being melted down by applying high temperature and of strongly being fixed by cooling. Further, two L-shaped frames 5 are also adhered and fixed on the internal surface and the internal side surface of the front case at the display section side 1 by the heat adhesive 11 capable of being melted down by applying high temperature and of strongly being fixed by cooling.

In this embodiment, the front case at the display section side 1, the bathtub-shaped draw frame 4 and the two L-shaped frames 5 are strongly rendered to be integral with each other by the heat adhesives 10 and 11 to further increase strength of the parts.

A thickness size of the bathtub-section 4a as a deepness of drawing of the bathtub-shaped draw frame 4 and a thickness size of the bending section 5a as a height of bending of the L-shaped frame 5 forms a thickness portion of the bathtub-section 4a and a thickness portion of the bending section 5a within a thickness of the front case at the display section side 1, as illustrated in FIG. 5. Therefore, as a thickness of the equipment, a thickness of sum of the thickness of the bathtub-shaped draw frame 4 and the thickness of the L-shaped frame 5 can be held within the thickness of the front case at the display section side 1 as a main part, although making the metal plate be a shape of increased rigidity by drawing or bending. Consequently, a thin-type housing structure can be realized while achieving strength thereof.

Thus, in this embodiment, the front case at the display section side 1 of a frame shape is formed of a metal material having strength and further the bathtub-shaped draw frame 4 formed by drawing the metal plate material is fixed at the external side of the front case at the display section side 1 by the heat adhesive 10. The front case at the display section side 1 and the bathtub-shaped draw frame 4 are thereby rendered to be integral with each other. Furthermore, the two L-shaped frames 5 formed by bending the metal plate materials are fixed at the internal side of the front case at the display section side 1 by the two heat adhesives 11. The front case at the display section side 1 and the L-shaped frames 5 are thereby rendered to be integral with each other.

Namely, in this embodiment, the two L-shaped frames 5 and the bathtub-shaped draw frame 4 each made of a metal plate material reinforced by bending or drawing are thermally adhered and fixed on internal and external surfaces of the front case at the display section side 1 formed of a metal material, such as a magnesium alloy, and the like. A plurality of parts, such as the front case at the display section side 1, the two L-shaped frames 5, and the bathtub-shaped draw frame 4 are rendered to be integral with each other to have the sandwich structure. Thereby, it is possible to drastically improve rigidity mainly against bending, even if a portable terminal equipment, such as a folding-type portable telephone, and the like becomes a thin-type one.

Further, in this embodiment, the front case at the display section side 1 is determined to have a minimum thickness thereof, so that the substrate 9 on which the LCD for display 7, the LCD frame 8 and the electrical parts are mounted may be mounted on the front case at the display section side 1. The thickness of sum of the deepness of drawing of the bathtub-shaped draw frame 4 and the height of bending of the L-shaped frame 5 is held within the thickness of the front case at the display section side 1 as a main part. Consequently, the portable terminal equipment, such as the folding-type portable telephone, and the like can be a thin-type one while achieving strength thereof.

Besides, in the present invention, description was made about the front case at the display section side 1 to have the sandwich structure in the above embodiment. The rear cover at the display section side 2 or the housing at the operation section 3 can also be formed to have the sandwich structure. The present invention can be applied to any housing parts of the portable terminal equipment, such as the folding-type portable telephone, and the like. The sandwich structure can also be applied to a plurality of main parts.

Besides, in the present invention, description was made about the above embodiment in which a material of the front case at the display section side 1 is a metal material. The front case at the display section side 1 can also be made of a resin material. When the front case at the display section side 1 is made of a resin material, strength of the front case at the display section side 1 becomes lower than that of a case of the metal material. However, the front case at the display section side 1 made of the resin material brings a meritorious point that productivity of the front case at the display section side 1 can be improved.

Further, in the present invention, description was made about the above embodiment in which main housings and metal plate parts are fixed on each other by heat adhesives to form a sandwich structure. It can be considered that the main housings and the metal plate parts are fixed on each other not by the heat adhesives but by a double-stick tape, and the like. Further, if the other method of fixing brings similar effects, the other method can be used without a particular problem. Moreover, in the present invention, a fixing method in which the main housings and the metal plate parts are integrally formed by an insert formation can be considered.

POSSIBILITY OF INDUSTRIAL USE

The present invention is a technique that can be mainly applied to a thin-size folding-type portable telephone. However, the present invention can also be applied to a thin-size portable terminal equipment, such as a PDA (Personal Digital Assistant), a note-type personal computer, and the like.

The invention claimed is:
1. A portable terminal equipment comprising:
a plurality of housing parts including a particular housing part;
an L-shaped frame made of a metal plate adhered to and fixed on an internal surface of said particular housing part such that said metal plate is integral with said particular housing part;
a bathtub-shaped draw frame made of a metal plate adhered to and fixed on an external surface of said particular housing part such that said metal plate is integral with said particular housing part,
wherein said particular housing part has a sandwich structure due to said metal plate of which said L-shaped frame is made and said metal plate of which said bathtub-shaped draw frame is made being integral with said particular housing part, said bathtub-shaped draw frame comprises a central portion which forms a bathtub section having a U-shaped cross section, and an end portion which is protruded from an opening side edge portion of a side face of said bathtub section to form a L-shaped cross section together with the side face of the bathtub section, and said L-shaped frame is adhered and fixed along with an angle portion of an internal surface of said housing part, and the end portion of said bathtub-shaped draw frame is adhered and fixed along with an angle portion of an external surface of said housing part, wherein said housing part is located at both end portions of said portable terminal equipment, and one said L-shaped frame is adhered and fixed along with an angle portion of an internal surface of said housing part at one end portion, and the other said L-shaped frame is adhered and fixed along with an angle portion of an internal surface of said housing part at the other end portion, and one end portion of said bathtub-shaped draw frame is adhered and fixed alone with an angle portion of an internal surface of said housing part at one end portion, and the other end portion of said bathtub-shaped draw frame is adhered and fixed along with an angle portion of an internal surface of said housing part at the other end portion.

2. A portable terminal equipment as claimed in claim 1, wherein said housing parts include at least a front case at a display section side, a rear cover at a display section side, and a housing at an operation section side, said rear cover being other than said particular housing part.

3. A portable terminal equipment as claimed in claim 2, wherein, said particular housing part is said front case at a display section side, and a frame portion of said front case at a display section side is made of a metal alloy material.

4. A portable terminal equipment as claimed in claim 3, wherein said L-shaped frame and said bathtub-shaped draw frame are adhered to and fix on said particular housing part such that no gaps exist between said particular housing part and each of L-shaped frame and said bathtub-shaped draw frame.

5. A portable terminal equipment as claimed in claim 2, wherein said L-shaped frame has a bending section formed by bending a material from which said metal plate is fabricated, from said rear cover at said display section side to said front case at said display section side, and wherein said bathtub-shaped draw frame is located such that a bathtub section thereof is opened from said rear cover at said display section side to said front case at said display section side.

6. A portable terminal equipment as claimed in claim 1, wherein said portable terminal equipment is a folding portable telephone.

7. A housing reinforcing structure for use in a portable terminal equipment, comprising:
   a plurality of housing parts including a particular housing part;
   an L-shaped frame made of a metal plate adhered to and fixed on an internal surface of said particular housing part such that said metal plate is integral with said particular housing part;
   a bathtub-shaped draw frame made of a metal plate adhered to and fixed on an external surface of said particular housing part such that said metal plate is integral with said particular housing part, wherein said particular housing part has a sandwich structure due to said metal plate of which said L-shaped frame is made and said metal plate of which said bathtub-shaped draw frame is made being integral with said particular housing part, said bathtub-shaped draw frame comprises a central portion which forms a bathtub section having a U-shaped cross section, and an end portion which is protruded from an opening side edge portion of a side face of said bathtub section to form a L-shaped cross section together with the side face of the bathtub section, and said L-shaped frame is adhered and fixed along with an angle portion of an internal surface of said housing part, and the end portion of said bathtub-shaped draw frame is adhered and fixed along with an angle portion of an external surface of said housing part, wherein said housing part is located at both end portions of said portable terminal equipment, and one said L-shaped frame is adhered and fixed along with an angle portion of an internal surface of said housing part at one end portion, and the other said L-shaped frame is adhered and fixed along with an angle portion of an internal surface of said housing part at the other end portion, and one end portion of said bathtub-shaped draw frame is adhered and fixed alone with an angle portion of an internal surface of said housing part at one end portion, and the other end portion of said bathtub-shaped draw frame is adhered and fixed along with an angle portion of an internal surface of said housing part at the other end portion.

8. A housing reinforcing structure as claimed in claim 7, wherein said housing parts include at least a front case at a display section side, a rear cover at a display section side, and a housing at an operation section side, said rear cover being other than said particular housing part.

9. A housing reinforcing structure as claimed in claim 8, wherein said particular housing part is said front case at a display section side, and a frame portion of said front case at a display section side is made of a metal alloy material.

10. A housing reinforcing structure as claimed in claim 9, wherein said L-shaped frame and said bathtub-shaped draw frame are adhered to and fix on said particular housing part such that no gaps exist between said particular housing part and each of L-shaped frame and said bathtub-shaped draw frame.

11. A housing reinforcing structure as claimed in claim 8, wherein said L-shaped frame has a bending section formed by bending a material from which said metal plate is fabricated, from said rear cover at said display section side to said front case at said display section side, and wherein said bathtub-shaped draw frame is located such that a bathtub section thereof is opened from said rear cover at said display section side to said front case at said display section side.

12. A housing reinforcing structure as claimed in claim 7, wherein said portable terminal equipment is a folding portable telephone.

* * * * *